(12) United States Patent
Goto (10) Patent No.: US 9,283,805 B2
(45) Date of Patent: Mar. 15, 2016

(54) AUTOMOBILE WHEEL

(75) Inventor: Yoshifumi Goto, Aichi (JP)

(73) Assignee: CENTRAL MOTOR WHEEL CO., LTD., Aichi (JP)

(*) Notice: Subject to any disclaimer, the term of this patent is extended or adjusted under 35 U.S.C. 154(b) by 284 days.

(21) Appl. No.: 13/993,020

(22) PCT Filed: Feb. 7, 2011

(86) PCT No.: PCT/JP2011/052496
§ 371 (c)(1),
(2), (4) Date: Jun. 10, 2013

(87) PCT Pub. No.: WO2012/107989
PCT Pub. Date: Aug. 16, 2012

(65) Prior Publication Data
US 2013/0257139 A1     Oct. 3, 2013

(51) Int. Cl.
*B60B 3/10*     (2006.01)
*B60B 3/00*     (2006.01)
(Continued)

(52) U.S. Cl.
CPC . *B60B 3/10* (2013.01); *B60B 3/005* (2013.01); *B60B 3/04* (2013.01); *B60B 3/12* (2013.01); *B60B 2310/206* (2013.01);
(Continued)

(58) Field of Classification Search
CPC ............ B60B 3/02; B60B 3/04; B60B 3/041; B60B 3/044; B60B 3/045; B60B 3/10; B60B 3/005; B60B 3/12
USPC ............ 301/63.101, 63.103, 63.104, 63.105, 301/63.107, 63.108, 64.101
See application file for complete search history.

(56) References Cited

U.S. PATENT DOCUMENTS

| | | | | |
|---|---|---|---|---|
| 7,104,611 B2* | 9/2006 | Alff | ........................ | B60B 3/002 301/35.621 |
| 7,464,995 B2* | 12/2008 | Csapo | ..................... | B60B 3/004 301/35.626 |
| 7,559,145 B2* | 7/2009 | Jacke | ................... | B21D 53/265 29/894.3 |

(Continued)

FOREIGN PATENT DOCUMENTS

| JP | 2009-113798 A | 5/2009 |
|---|---|---|
| JP | 2009-525191 A | 7/2009 |

(Continued)

OTHER PUBLICATIONS

International Search Report issued in International Application No. PCT/JP2011/0542496 mailed Apr. 26, 2011.

*Primary Examiner* — John Walters
(74) *Attorney, Agent, or Firm* — McDermott Will & Emery LLP (57) ABSTRACT

An automobile wheel is provided with a spoke section and a disk flange section. The spoke section is provided with a central groove section and raised side section disposed on either side of the central groove section. The raised side sections are provided with a peak side section that protrudes to the front and a flange section that extends from the side edge of the peak side section to the back. Meanwhile, the disk flange section is provided with a connector section and front edge sections that curve radially inward from the front edge of the connector section. The front edge sections are depressed toward the back relative to the peak side section of the raised side section. This automobile wheel, by means of the synergy between the shape effects of the spoke section and the disk flange section, improves strength and rigidity for withstanding radial loads and bending/torsional loads.

6 Claims, 10 Drawing Sheets

(51) Int. Cl.
 *B60B 3/04* (2006.01)
 *B60B 3/12* (2006.01)

(52) U.S. Cl.
 CPC .... *B60B 2310/302* (2013.01); *B60B 2360/102* (2013.01); *B60B 2900/311* (2013.01)

(56) References Cited

U.S. PATENT DOCUMENTS 7,587,825 B2    9/2009  Coleman et al.
7,984,551 B2 *  7/2011  McCorry ................ B60B 3/007
                                                 29/894
8,454,099 B2 *  6/2013  Sano ....................... B60B 3/002
                                                 301/63.103
2010/0289323 A1  11/2010  Sano et al.

FOREIGN PATENT DOCUMENTS

JP    2010-132277 A    6/2010
JP    2010-132278 A    6/2010
JP    2010-132279 A    6/2010
JP    2010-241413 A   10/2010

* cited by examiner

AUTOMOBILE WHEEL

RELATED APPLICATIONS

This application is the U.S. National Phase under 35 U.S.C. §371 of International Application No. PCT/JP2011/052496, filed on Feb. 7, 2011, the disclosures of which Application are incorporated by reference herein.

FIELD OF THE INVENTION

The present invention relates to an automobile wheel including a wheel rim on which a tire is to be mounted and a wheel disk to be attached to an axle.

BACKGROUND ART

As an automobile wheel, for example, a 2-piece type automobile wheel is currently available, in which a substantially cylindrical wheel rim and a substantially disk-shaped wheel disk are fit to each other by welding. The wheel rim which is a component of the 2-piece type automobile wheel includes a bead sheet section for supporting tire bead and a flange section on both its front and rear sides thereof, and additionally a configuration provided with a well section which is dented inward between the front and rear bead sheets has been known. On the other hand, as the wheel disk, there has been known a configuration which includes a circular hub mounting section to be attached to an axle, a plurality of spoke sections provided radially outward from an outer periphery of the hub mounting section and a circular disk flange section which is formed consecutively with an outer end of the spoke section. Here, a plurality of decorative holes is formed between adjacent spoke sections in the wheel disk by the spoke sections and the disk flange section. By fitting the disk flange section of the wheel disk into a well section in the wheel rim and welding both of them, the automobile wheel is formed.

In an example of the above-described automobile wheel, as disclosed in the translation of PCT Application No. 2009-525191 (see FIG. 1, FIG. 2) for example, the wheel disk includes a flat cylindrical disk flange section which is extended substantially in an axial direction, and decorative holes are defined by spoke sections adjacent to the disk flange section.

SUMMARY OF THE INVENTION

Problem to be Solved by the Invention

The configuration disclosed in the above-described translation of PCT Application No. 2009-525191 (see FIG. 1, FIG. 2)

has an advantage that its design characteristic is excellent because the disk flange section of the wheel disk is formed into a flat cylinder and therefore the decorative holes in a relatively large size are formed outward in a radial direction. By the way, during traveling of a vehicle on which the automobile wheel is mounted, a radial load is applied to the disk flange section through a wheel rim, and bending/torsional loads are applied thereto from the hub mounting section through the spoke sections. Because the disk flange section of the translation of PCT Application No. 2009-525191 (see FIG. 1, FIG. 2)

is of a flat cylinder, it may be deformed easily by application of the aforementioned loads and consequently, the deformation induces a fear that concentration of stress may be generated at a joint section in which the wheel rim and the wheel disk are welded together. Then, reduction of fatigue life is also feared by the concentration of stress.

The present invention proposes an automobile wheel capable of exerting an excellent strength and rigidity in order to solve the above-described problem.

Means for Solving Problem

An automobile wheel of the present invention includes: a wheel rim on which a tire is to be mounted; and a wheel disk including a hub mounting section to be attached to an axle, a disk flange section which is fit to an internal surface of the wheel rim, and a plurality of spoke sections for connecting the hub mounting section to the disk flange section. In the automobile wheel, the spoke section includes a central groove section which is dented rearward in a radial direction and raised side sections which are raised toward the front side from both side edges of the central groove section in the radial direction, and each of the raised side sections includes a peak side section which protrudes most toward the front side and flange sections which extend rearward from side edges of the peak side section. The disk flange section includes a connector section which is provided in the front-rear direction and fit to the wheel rim, and a circular front edge section which extends from a front edge of the connector section such that the front edge section is bent inward in the radial direction and which is retreated rearward with respect to the peak side section of the raised side section of the spoke section. A decorative hole is defined by the flange sections of the adjacent spoke sections and the front edge section of the disk flange section. Here, the front side means a designed side of the automobile wheel and the rear side means a rear surface side of the automobile wheel.

Here, the disk flange section includes the front edge section at places which are not consecutive with the spoke section and a plurality of the front edge sections is provided intermittently in the circumferential direction. Because the front edge section configures the periphery of the decorative hole, according to the present invention, the decorative hole is not formed up to the outermost periphery of the wheel disk. Furthermore, because it is preferable that the flange section of the spoke section and the front edge section of the disk flange section are formed smoothly consecutive with each other, the decorative hole comes to possess a smooth hole periphery, thereby exerting a much higher design characteristic.

According to the configuration of the present invention, due to the shape effect between the central groove section and the raised side section, the spoke section is capable of exerting a high strength and rigidity against the bending/torsional loads applied to the wheel disk. Particularly, the shape effect of the raised side section having the flange section improves the effect of exerting the above-described high strength and rigidity further. On the other hand, due to an effect of the configuration in which the front edge section of the disk flange section is bent inward in the radial direction from the connector section and an effect of the configuration in which the front edge section of the disk flange section is retreated rearward with respect to the peak side section of the raised side edge section of the spoke section, the high strength and rigidity which withstand the radial load and the bending/torsional loads applied to the disk flange section can be exerted. Due to synergy of the shape effect of the spoke section and the shape effect of the disk flange section, the strength and rigidity which withstand loads applied to the automobile wheel during traveling of a vehicle are improved. Consequently, deformation of the disk flange section which may occur during traveling of a vehicle can be inhibited so as to relax concentration of stress applied to a joint section in which the wheel disk and the wheel rim are joined together.

Furthermore, because the flange section of the spoke section is extended rearward, an end surface of the flange section is difficult to see from the front side (designed surface side). Thus, the design characteristic of the automobile wheel can be improved. In addition, because the decorative holes are formed on a rearward side with respect to the peak side section by the flange section of the spoke section and the front edge section of the disk flange section, an effect of showing the spoke section as if it floats up to the front side is high. Thus, concavity and convexity in the configuration of the spoke section and the decorative hole are easy to see, so that the effect of improving the design characteristic is intensified further. Therefore, the present configuration allows a high design characteristic to be attained while improving the strength and rigidity.

Furthermore, the configuration of the present invention can raise the freedom level of design of a wheel cap to be attached to cover the front surface of the automobile wheel. For example, when using the wheel cap having openings to cover the periphery of the decorative hole, the wheel cap having openings whose peripheral section is inclined largely rearward can be formed. The reason for this is that the front edge section of the disk flange section and the flange section of the spoke section, which configure the periphery of the decorative hole, are provided on a rearward side with respect to the peak side section of the spoke. In the wheel cap, a design range for the angle for inclining the periphery of the opening with respect to the peak section is widened and in correspondence therewith, a configuration based on various design characteristics of the wheel cap can be designed. Particularly, by inclining the opening periphery largely with respect to the peak section, the opening section can be formed larger, thereby exerting a high design characteristic.

As another example of the above-described automobile wheel of the present invention, there is proposed a configuration in which the flange section of the raised side section is extended up to a height position in the front-rear direction of the front edge section of the disk flange section.

Because, in such a configuration, the height positions in the front-rear direction of the flange section of the spoke section and the front edge section of the disk flange section are the same, the above-described synergy of both of them which exert the high strength and rigidity withstanding the bending/torsional loads can be exerted more easily. Here, the width in the front-rear direction of the flange section is increased to improve the rigidity of the spoke section, and thereby the improvement effect of the strength and rigidity of the wheel disk is further intensified.

Furthermore, the flange section of the spoke section and the front edge section of the disk flange section are formed smoothly and consecutively with each other, so that the periphery of the decorative hole is formed in a smoothly curved shape. Consequently, the design characteristic can be improved. Because the flange section is extended up to a height position in the front-rear direction of the front edge section, the end surface of the flange section is more difficult to see.

Furthermore, as still another example of the above-described automobile wheel of the present invention, there is proposed a configuration in which the flange section of the raised side section which configures the spoke section is formed rearward beyond the front edge section of the disk flange section.

Such a configuration increases the width in the front-rear direction of the flange section, thereby further improving the rigidity of the spoke section and further improving the strength and rigidity of the wheel disc. In addition, the end surface of the flange section becomes more difficult to see and thereby the design characteristic thereof is improved further.

As yet still another example of the above-described automobile wheel of the present invention, there is proposed a configuration in which a height position in the front-rear direction of an outer end section of the central groove section which configures the spoke section is set to substantially the same position as a height position in the front-rear direction of the front edge section of the disk flange section.

Because in such a configuration, the central groove section is formed substantially deep, the improvement effect of the rigidity of the spoke section is high. By forming the outer end section of the central groove section at substantially the same height position as the front edge section of the disk flange section, the peak side section of the spoke section provided therebetween looks as if it protrudes to the front, and thereby an effect of showing the spoke section as if it floats up to the front side is improved further. As a result, the design characteristic thereof can be improved.

Effect of the Invention

In the automobile wheel of the present invention, as described above, the spoke section includes the central groove section which is dented rearward and the raised side sections which include the flange sections which are provided on both sides of the central groove section and extended rearward from a side edge of the peak side section protruded to the front side. On the other hand, the disk flange section includes a connector section which is provided in the front-rear direction and a front edge section which is bent inward in the radial direction from a front edge of the connector section and which is retreated rearward with respect to the peak side section of the raised side section of the spoke section. Due to the synergy of the shape effect of the spoke section and the shape effect of the disk flange sections, the strength and rigidity withstanding the radial load and the bending/torsional loads, which are applied to the automobile wheel, are improved. Consequently, deformation of the disk flange section which may occur during traveling of a vehicle can be inhibited and concentration of stress applied to a joint section between the wheel disk and the wheel rim can be relaxed. At the same time, the automobile wheel can exert excellent durability against a load applied during traveling of a vehicle. Furthermore, because the decorative hole defined by the flange sections of the adjacent spoke sections and the front edge section of the disk flange section is formed on a rearward side with respect to the peak side section of the spoke section, concavity and convexity in configuration with respect to the spoke section can be shown clearly. As a result, design characteristic of the automobile wheel can be improved. Furthermore, because the flange section and the front edge section are provided on the rearward side with respect to the peak side section, the freedom level of design of the wheel cap when mounting the wheel cap is increased, thereby ensuring an advantageous effect that the wheel cap with an excellent design can be used.

BEST MODE FOR CARRYING OUT THE INVENTION

An embodiment of the present invention will be described in detail with reference to the accompanying drawings.

Figure 1:
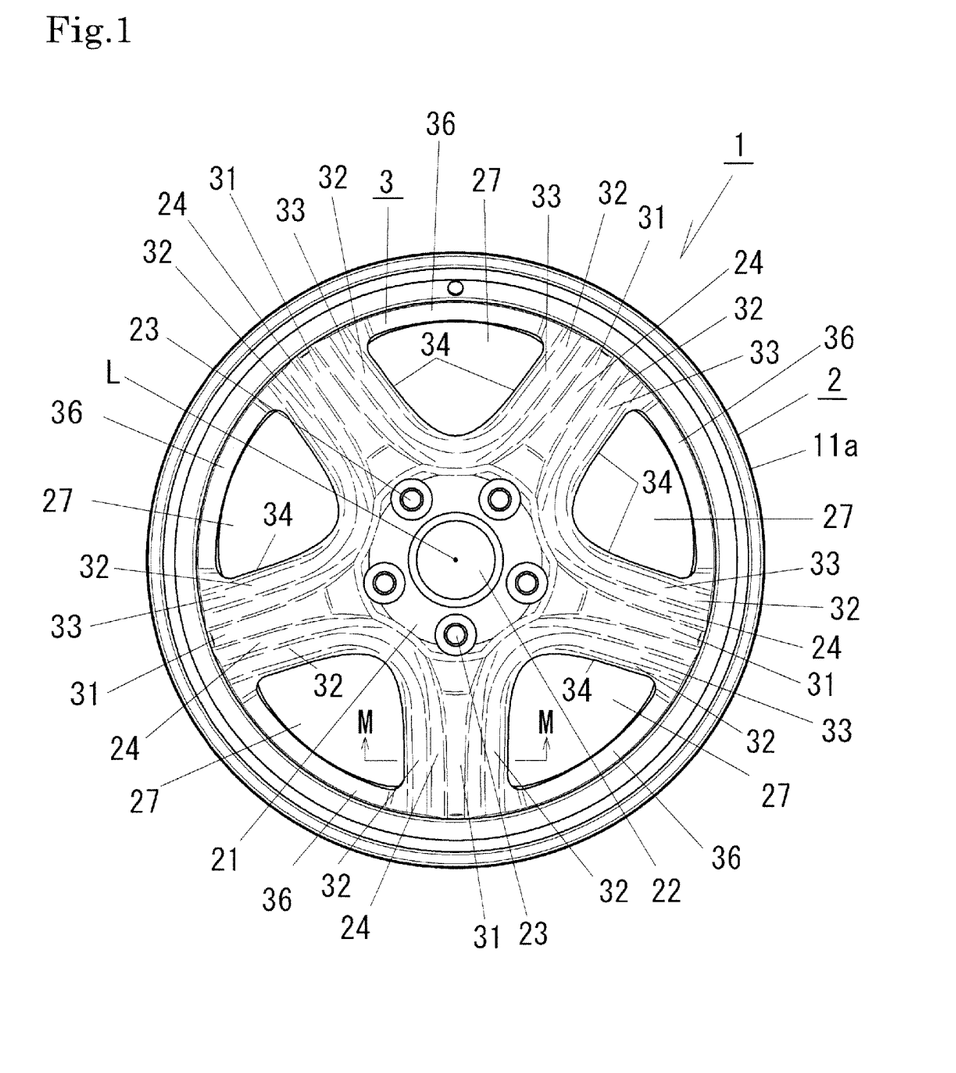
FIG. 1 is a plan view of an automobile wheel 1 according to an embodiment of the present invention.
Figure 2:
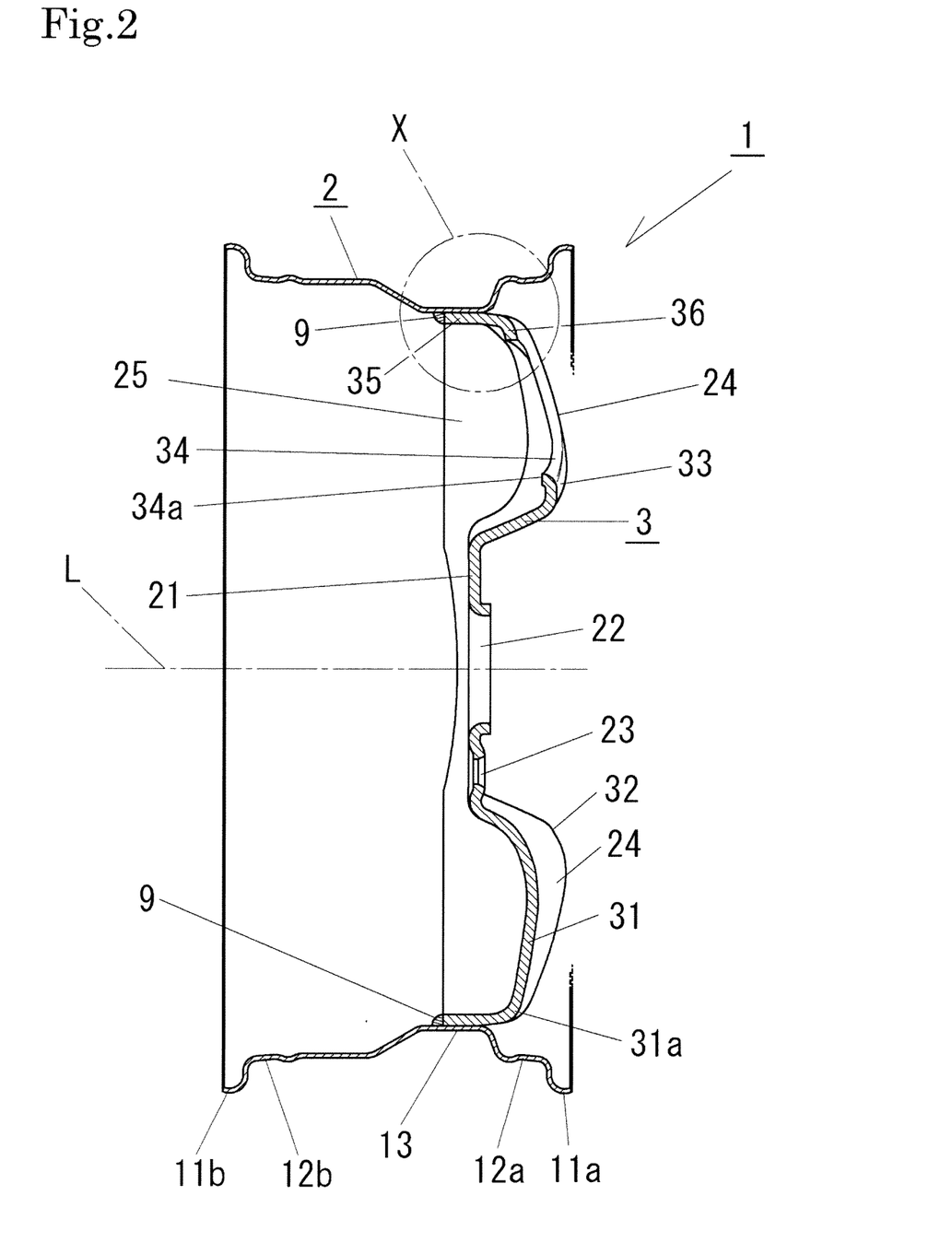
FIG. 2 is a vertical cross-sectional view of the above automobile wheel 1.
Figure 3:
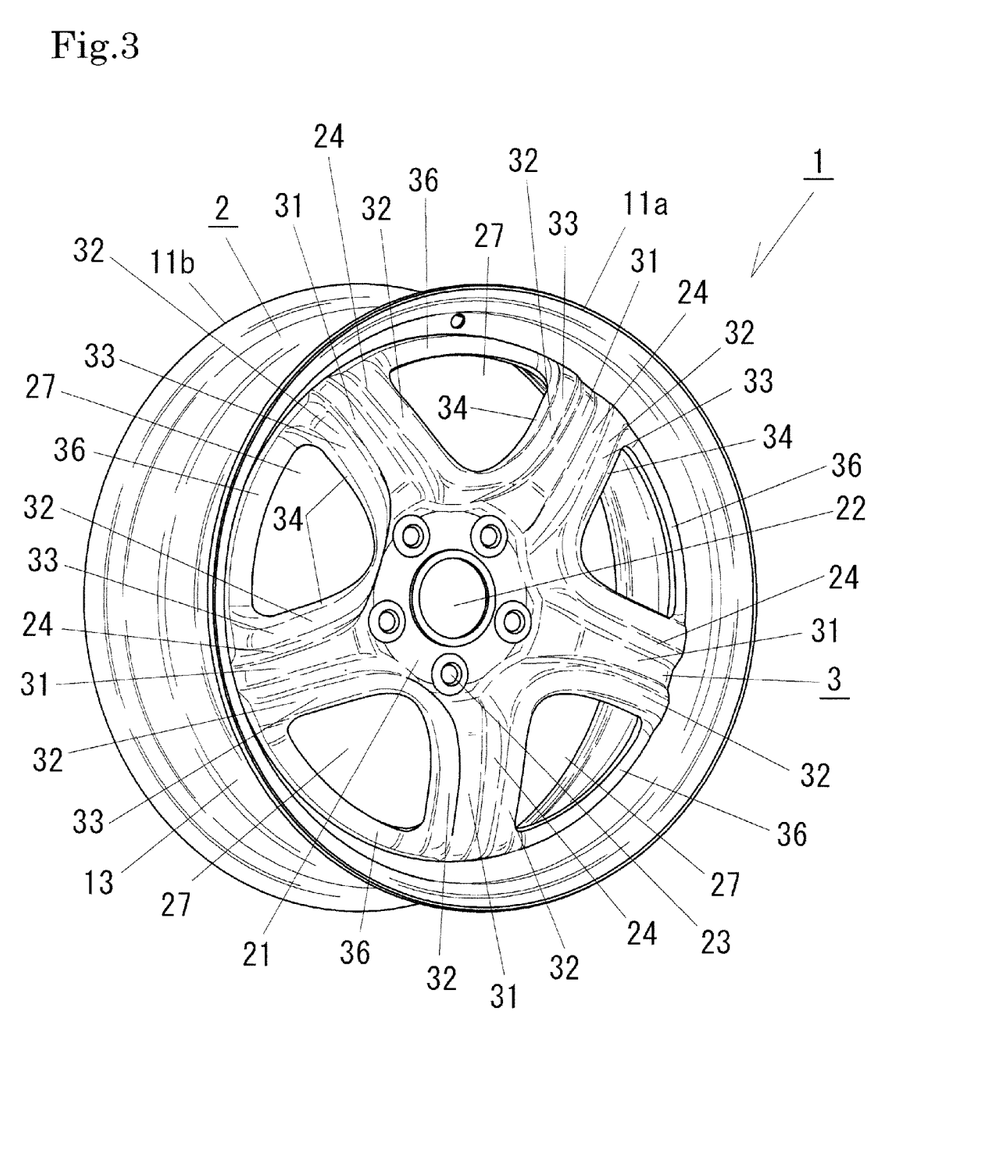
FIG. 3 is a perspective view of the above automobile wheel 1.

The automobile wheel 1 of the present embodiment has a so-called 2-piece type configuration in which, as shown in FIGS. 1 to 3, a disk flange section 25 of a wheel disk 3 is fit to an internal surface of a well section 13 of a wheel rim 2 so that the well section 13 is joined to the disk flange section 25 by fillet welding. Here, the wheel rim 2 and the wheel disk 3 are formed of steel sheets, so that the automobile wheel 1 of the present embodiment is made of steel. The fillet welding forms a joint section 9 in which the wheel rim 2 and the wheel disk 3 are welded together.

In the configuration of the present embodiment, a direction from the rear side of the wheel disk 3 to a design surface side is defined as forward and its opposite direction is defined as rearward. Additionally, a direction to a central axis L (see FIG. 2) of the automobile wheel 1 in a wheel radial direction (radius direction) is defined as inward and its opposite direction is defined as outward.

The aforementioned wheel rim 2 is formed cylindrically with an irregular shape cross-section, and rim flange sections 11a, 11b for supporting a side wall section of a tire (not shown) are formed on opening ends of both a front side and a rear sides thereof. Front side and rear side bead sheet sections 12a, 12b for receiving the bead of a tire are formed consecutively with the respective rim flanges 11a, 11b. A well section 13 which protrudes inward is provided between the bead sheet section 12a on the front side and the bead sheet section 12b on the rear side. When mounting a tire, the mounting of the tire can be performed easily by allowing the bead of the tire to drop into the well section 13.

The wheel rim 2 is obtained by forming a rectangular steel sheet having specified dimensions. Speaking in detail, a rectangular steel sheet is bent so that its short sides come to butt each other and those short sides are butt welded by upset butt welding to produce a cylindrical body (not shown). After that, roll forming is performed while specified dies are rotated from both inside and outside of the cylindrical body such that it is nipped therebetween in order to form into a desired wheel/rim shape. A manufacturing method for forming the wheel rim 2 from the rectangular sheet may be of any method known conventionally and description thereof is omitted here.

Figure 4:
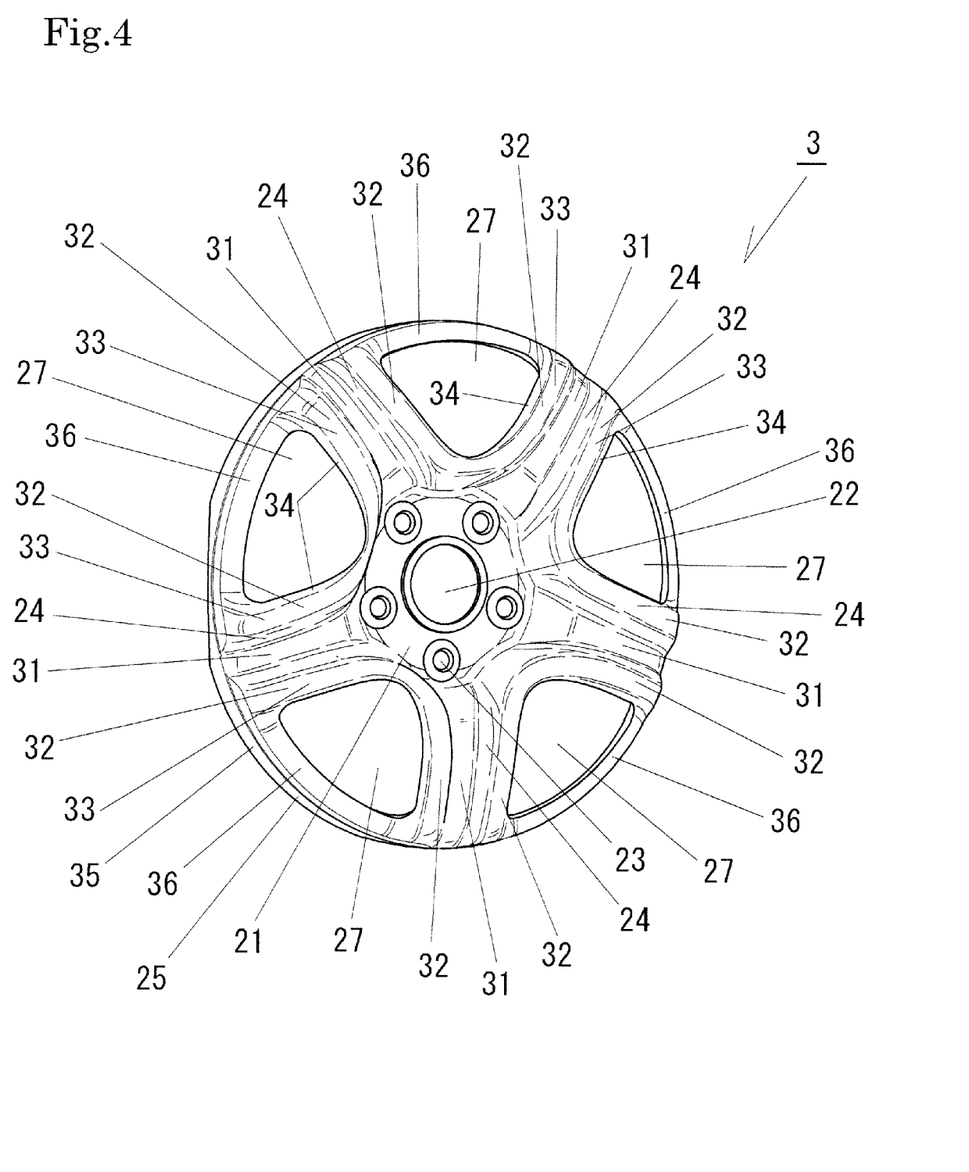
FIG. 4 is a perspective view of a wheel disk 3 of the above automobile wheel 1.
Figure 5:
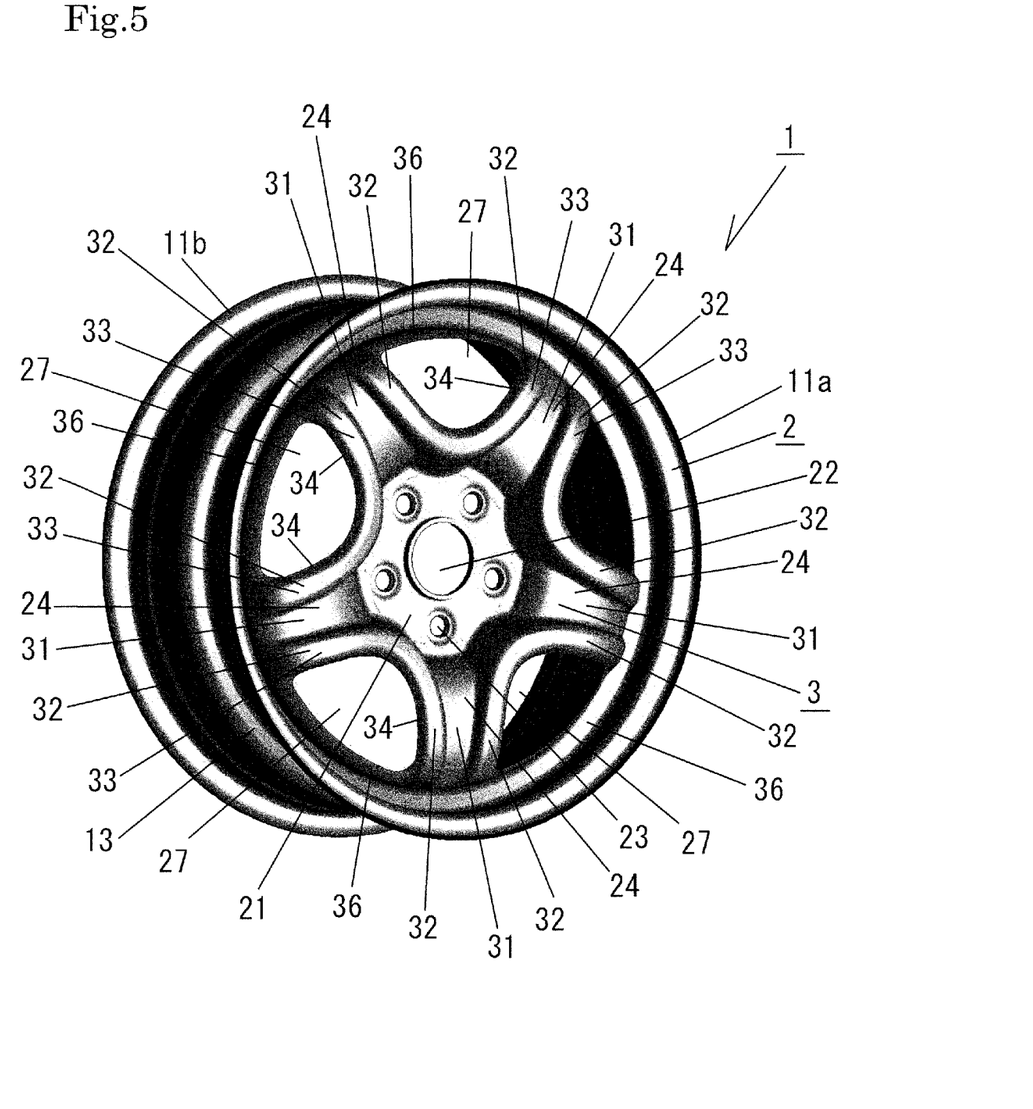
FIG. 5 is a perspective view of the automobile wheel 1.

The aforementioned wheel disk 3 is formed into a substantially disk shape as shown in FIGS. 2, 4 and provided with a substantially circular hub mounting section 21 containing a hub hole 22 opened in the center thereof. A plurality of spoke sections 24 is provided radially outward from an outer periphery of the hub mounting section 21. Then, the circular disk flange section 25 is formed on an outside end of each spoke section 24 consecutively with the spoke section 24. That is, the hub mounting section 21 and the disk flange section 25 are connected via a plurality of the spoke sections 24. The respective spoke sections 24 are spaced at an equal distance in a circumferential direction and a decorative hole 27 is formed between adjacent spoke sections 24, 24. The present embodiment includes the five spoke sections 24 and five decorative holes 27.

The hub mounting section 21 has a plurality of bolt holes 23 which are bored on the same circumference at an equal distance around the hub hole 22, the bolt holes each having nut seating. The hub mounting section 21 and the disk flange section 25 are provided coaxially around the central axis L of the wheel disk 3.

The wheel disk 3 is obtained by cutting four corners of a substantially square steel sheet into a circular shape and then, pressing the same square sheet. Speaking in detail, the steel sheet, from which the four corners have been cut into the circular shape, is formed into a pan-like shape such that its central portion is a circular recess, then, the hub mounting section 21 and the spoke sections 24 are formed by drawing, and the bolt holes 23 and the decorative holes 27 are bored. Further, the disk flange section 25 is formed by restriking processing and thereby the wheel disk 3 is completed. As described above, the wheel disk 3 can be produced in the same manufacturing method as a conventional one and therefore detailed description thereof is omitted.

Next, major sections of the present invention will be described.

As shown in FIGS. 1 to 5, the spoke section 24 of the above-described wheel disk 3 includes a central groove section 31 which is dented rearward in the radial direction and raised side sections 32, 32 provided on both sides of the central groove section 31. Here, the central groove section 31 is formed such that it is curved in the radius direction while flat in the circumferential direction (see FIG. 2). On the other hand, the raised side section 32 is raised to the front side (to the decorative surface side) from an edge of both sides thereof in the circumferential direction, and therefore, includes a peak side section 33 which protrudes most and flange sections 34 extending from a side edge of the peak side section 33 in the circumferential direction to the rear side. The peak side section 33 is formed into a flat shape having a specified width in the circumferential direction. Then, the adjacent spoke sections 24, 24 are so formed that the peak side sections 33 and the flange sections 34 of both the spoke sections are consecutive smoothly at their inside ends.

Figure 6:
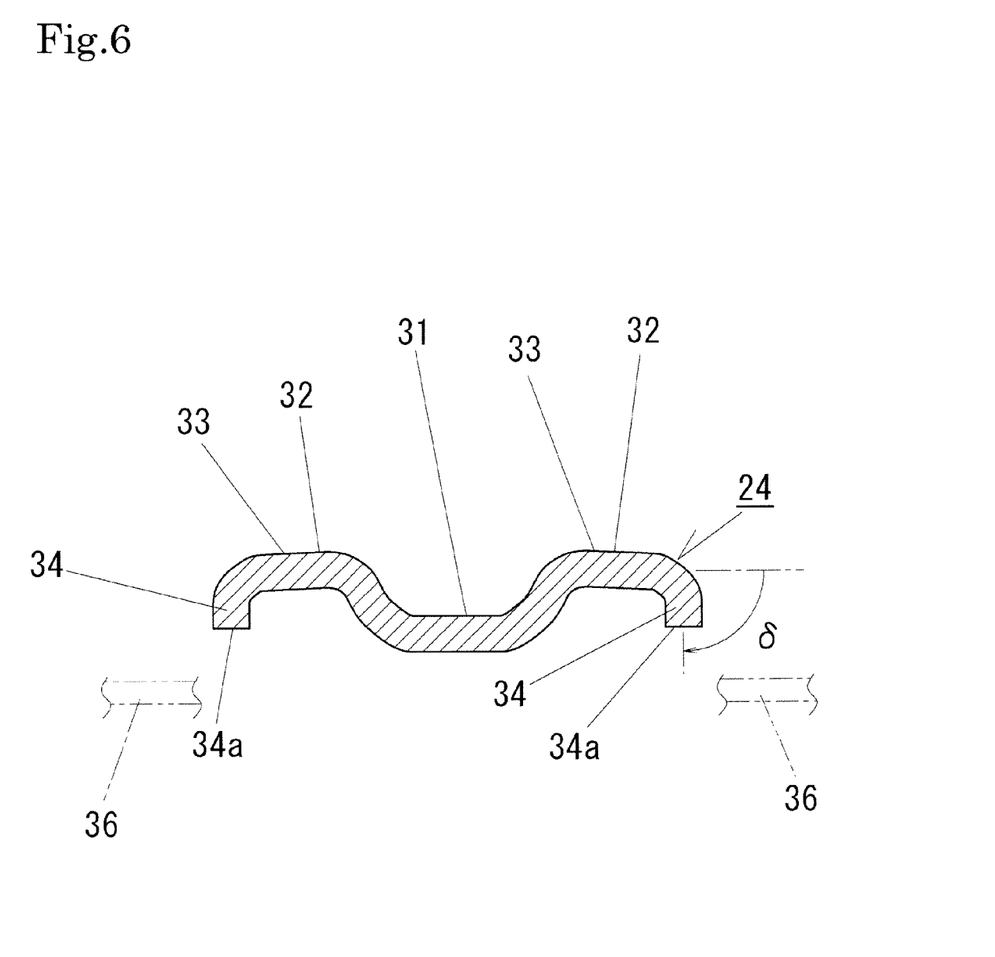
FIG. 6 is a cross-sectional view taken along the line M-M in FIG. 1.

The flange section 34 of the raised side section 32 is formed such that its end surface 34a is perpendicular to the central axis L (see FIG. 2). The flange section 34 is formed such that a height position in the front-rear direction of the end surface 34a is on the front side with respect to a front edge section 36 of the disk flange section 25, which will be described in detail below (see FIG. 6).

The spoke section 24 exerts a high strength and rigidity due to a shape effect of the central groove section 31 and the raised side sections 32, 32. Here, the raised side section 32 contributes largely to improvement of the strength and the rigidity due to the shape effect of the peak side section 33 and the flange section 34. Then, the spoke section 24 contributes to improvement of the strength and rigidity which withstand the bending/torsional loads on the wheel disk 3. Here, preferably, the flange section 34 is configured so that an angle δ thereof with respect to the above-described flat peak side section 33 (see FIG. 6) is more than 0° to less than 120°. In the present embodiment, the aforementioned angle δ is set to substantially 90°. Consequently, the improvement effect of the strength and rigidity of the spoke section 24 due to the shape effect of the flange section 34 can be increased further.

In case of a configuration in which the spoke section has no flange section, the shape effect of the raised side sections 32, 32 decreases compared to the configuration of the present embodiment, and at the same time, synergy with the shape effect of the central groove section also decreases. Accordingly, the strength and rigidity of a level which the configuration of the present embodiment is capable of attaining cannot be exerted. That is, significance of providing the spoke section 24 with the flange section 34 in order to withstand the bending/torsional loads which may be applied to the spoke section is high.

On the other hand, the disk flange section 25 includes a circular connector section 35 which runs in the front-rear direction and a circular front edge section 36 which extends such that it is bent inward in a radial direction from the front edge of the connector section 35. Here, the front edge section 36 is formed between the adjacent spoke sections 24, 24 and so that it is consecutive smoothly with the flange sections 34, 34 of the spoke sections 24, 24 on both sides thereof in the circumferential direction. Then, the decorative hole 27 is defined by the flange sections 34, 34 of the adjacent spoke sections 24, 24 and the front edge section 36 between the spoke sections 24, 24. As a result, the flange sections 34, 34 and the front edge section 36 configure a peripheral edge of the decorative hole 27.

The front edge sections 36 are provided intermittently in the circumferential direction and formed coaxially around the central axis L. Each of the front edge sections 36 is formed such that it is retreated rearward in a step-like fashion with respect to the peak side section 33 of the spoke section 24. As a result, the peak side section 33 and the front edge section 36 are formed consecutive with each other via the flange section 34, and thus, the outer end section of the flange section 34 constructs a step section which provides a difference of step between both of them.

Figure 7:
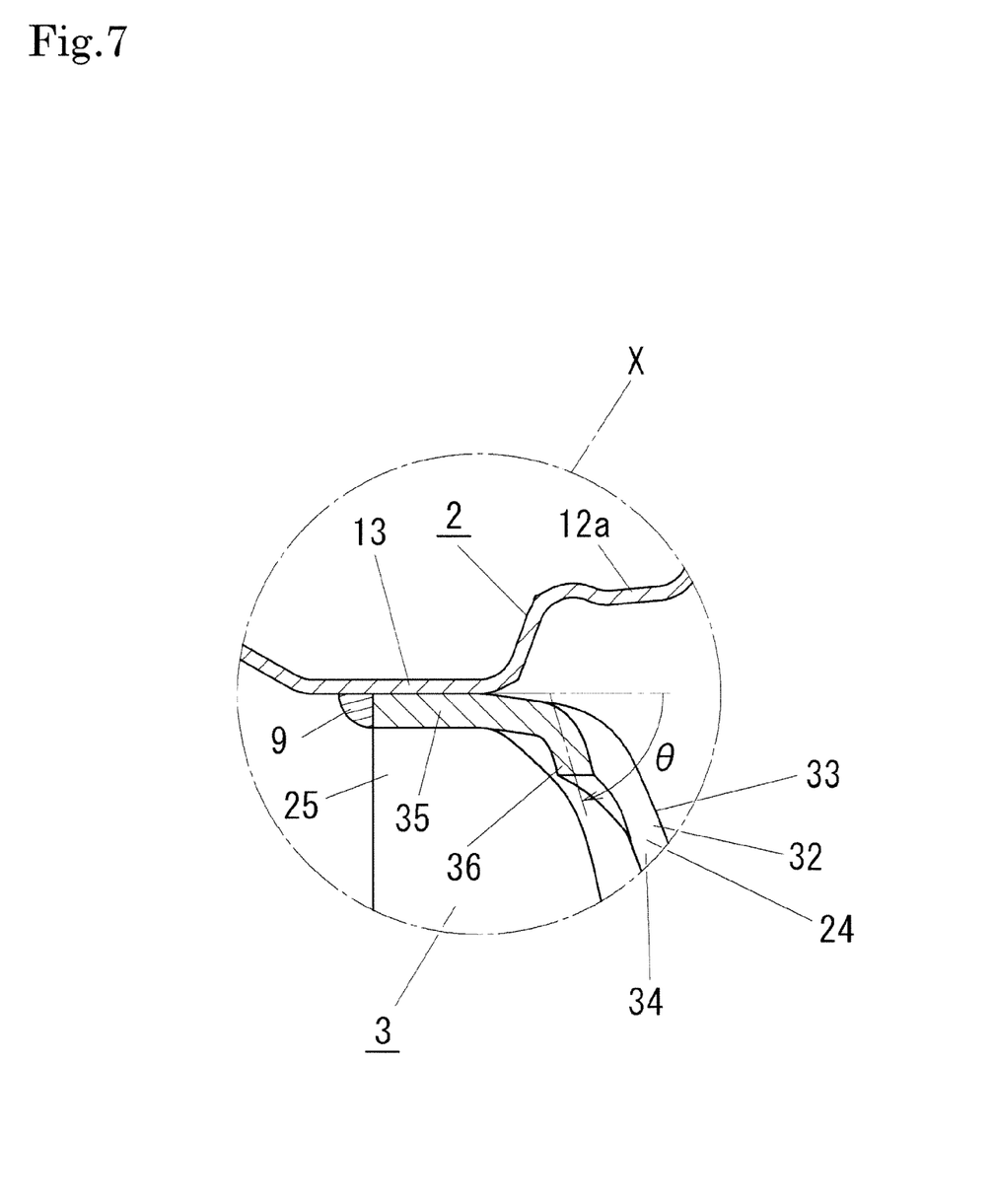
FIG. 7 is an enlarged view of a section X in FIG. 2.

The front edge section 36 is set such that a bending angle θ with respect to the connector section 35 is equal to or less than 135°. That is, as shown in FIG. 7, the front edge section 36 is bent from the front edge of the connector section 35 to the rear side thereof such that the bending angle θ is not larger than 135°. Here, a configuration having the bending angle θ between 45° and 90° is preferable. Consequently, the improvement effect of the strength and rigidity of the disk flange section 25 which will be described below is attained easily.

Furthermore, the front edge section 36 is formed at substantially the same height position in the front-rear direction as that of an outer end section 31a of the central groove section 31 of the spoke section 24 (see FIG. 2). Here, the front edge section 36 has a width in the front-rear direction, which depends on the bending angle θ, and likewise, the outer end section 31a of the central groove section 31 has a width in the front-rear direction which is produced depending on a curved shape in the radial direction thereof. Thus, by setting both of them to overlap each other within the respective widths in the front-rear direction, the aforementioned height positions in the front-rear direction thereof are specified to be substantially the same. When the height positions in the front-rear direction of the front edge section 36 and the outer end section 31a of the central groove section 31 are specified to be substantially the same, as described below, the raised side section 32 of the spoke section 24 is seen easily as if it floats up on the front side. This may improve the design characteristic of the automobile wheel 1.

The above-described disk flange section 25 can improve the strength and rigidity of the same disk flange section 25 due to the shape effect of the front edge section 36 provided between the adjacent spoke sections 24, 24. Here, the shape effect of the front edge section 36 is achieved by an effect caused by the configuration in which the front edge section 36 is bent inward in the radial direction from a front edge of the connector section 35 and an effect due to a configuration in which front edge section 36 is sunken rearward in a stepwise manner with respect to the peak side section 33 with a difference of step, and a remarkably high effect can be achieved compared to an effect by only any one of those configurations. In addition, due to the shape effect of the front edge section 36, deformation inhibition effect of the disk flange section 25 is improved. As a result, concentration of stress applied to the joint section 9 between the disk flange section 25 and the well section 13 of the wheel rim 2 can be relaxed.

According to the structure of the present embodiment, during traveling of a vehicle provided with the automobile wheel 1, the respective spoke sections 24 and the disk flange section 25 can exert a high resistance against radial loads applied via the wheel rim 2 and the bending/torsional loads applied via the hub mounting section 21 attached to an axle. This is attained by the synergy of the shape effect of the spoke section 24 and the shape effect of the disk flange section 25 as described above and this effect is exerted remarkably high compared to the shape effect caused by only any one of them. Then, the resistance against the bending/torsional loads is raised, thereby improving the deformation inhibition effect of the disk flange section 25. Consequently, the effect of relaxing the concentration of stress on the joint section 9 is improved and at the same time, the strength and rigidity of the automobile wheel 1 can be improved.

Furthermore, because the spoke section 24 has the flange section 34 which extends rearward, the end surface 34a of the flange section 34 is difficult to see from a front side thereof, thereby intensifying the design characteristic of the automobile wheel 1. Specifically, according to the structure of the present embodiment, the end surface 34a of the flange section 34 is formed in a direction perpendicular to the central axis L, and thus, an excellent effect of intensifying the design characteristic is ensured.

Because as described above, the periphery of the decorative hole 27 is configured by the flange sections 34, 34 of the adjacent spoke sections 24, 24 and the front edge section 36 of the disk flange section 25, the decorative hole 27 looks as if it is located on a rearward side with respect to the spoke section 24. The reason for this is that the flange section 34 of the spoke section 24 extends rearward and that the front edge section 36 of the disk flange section 25 is formed on a rearward side with respect to the peak side section 33. As a result, the spoke section 24 can be shown as if it floats up to the front side and therefore, the concavity and convexity in the configuration of the spoke section 24 and the decorative hole 27 can be made easier to recognize. As a result, the design characteristic of the automobile wheel 1 can be intensified. Here, the improvement effect of design characteristic is caused by synergy of both the flange section 34 and the front edge section 36 and this effect is more excellent than a case where only any one of them is provided.

Furthermore, according to the structure of the present embodiment, the front edge section 36 which constitutes the periphery of the decorative hole 27 is dented rearward and the flange section 34 extends rearward. Therefore, when mounting a wheel cap on the automobile wheel 1, for example, the freedom level of designing the configuration of the wheel cap is improved. Here, if the wheel cap has a configuration having openings which cover the periphery of each decorative hole 27, the openings are configured into a shape proximate to the periphery of the decorative hole. This is for the purpose of improving the design characteristic by forming an area of the opening section as large as possible. According to the present embodiment, the front edge section 36 is retreated rearward with respect to the peak side section 33 with a difference of step. Thus, compared to an automobile wheel configured such that the front edge section is located at the same position as the peak side section in the front-rear direction, the opening section can be formed such that it is inclined largely rearward and accompanied by this, the area of the opening section can be formed large. Because the opening section can be designed to be large, the freedom level of design of the wheel cap is improved.

Figure 8:
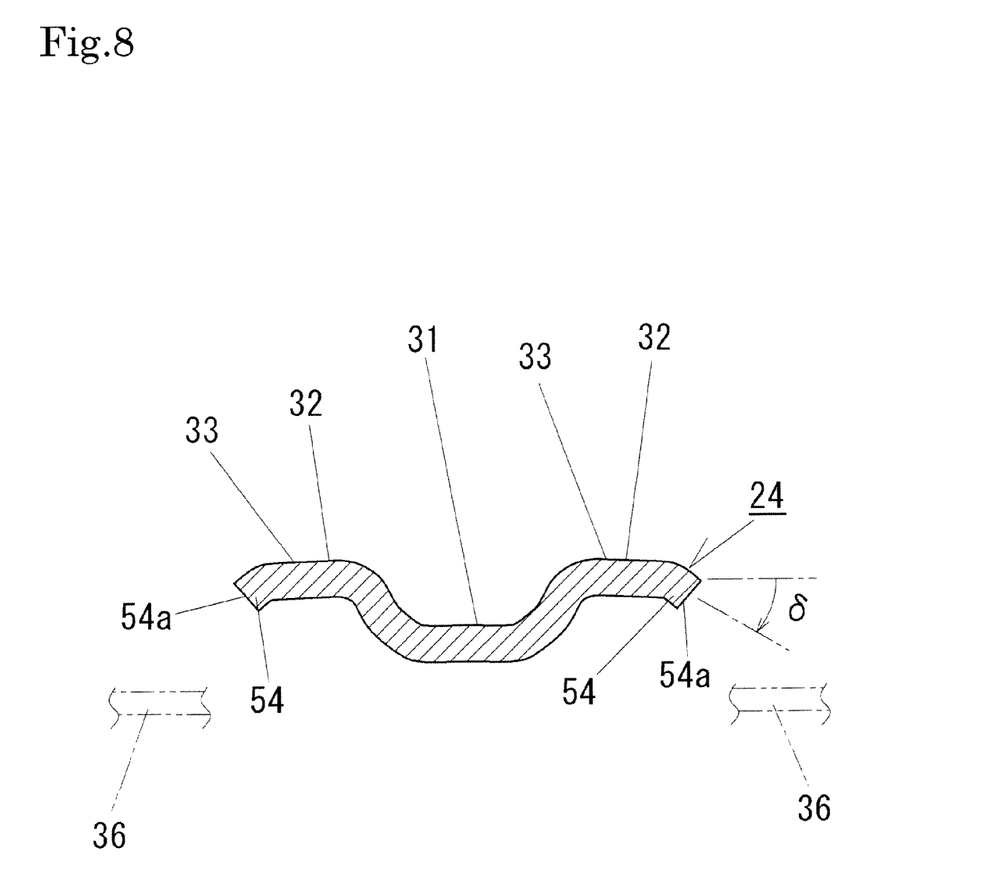
FIG. 8 is a vertical cross-sectional view of a spoke section 54 in another example 1.

On the other hand, as another example 1 of the above-described embodiment, a configuration in which an end surface 54a of a flange section 54 of the spoke section 24 is inclined to face the decorative hole 27 as shown in FIG. 8 has been proposed. The configuration of the example 1 is different from the above-described embodiment in only the shape of the flange section 54. According to the example 1, an angle θ of the flange section 54 is set to substantially 30°. According to such a configuration, durability against the bending/torsional loads is increased by the spoke section 24 having the flange section 54 like the above-described embodiment, and further, the end surface 54a of the flange section 54 is difficult to recognize from the front side. As a result, the design characteristic can be improved. In this way, the configuration of the example 1 achieves the same operation and effect as the above-described embodiment. In the meantime, like reference numerals are attached to the same components as the above-described embodiment and description thereof is omitted.

Figure 9:
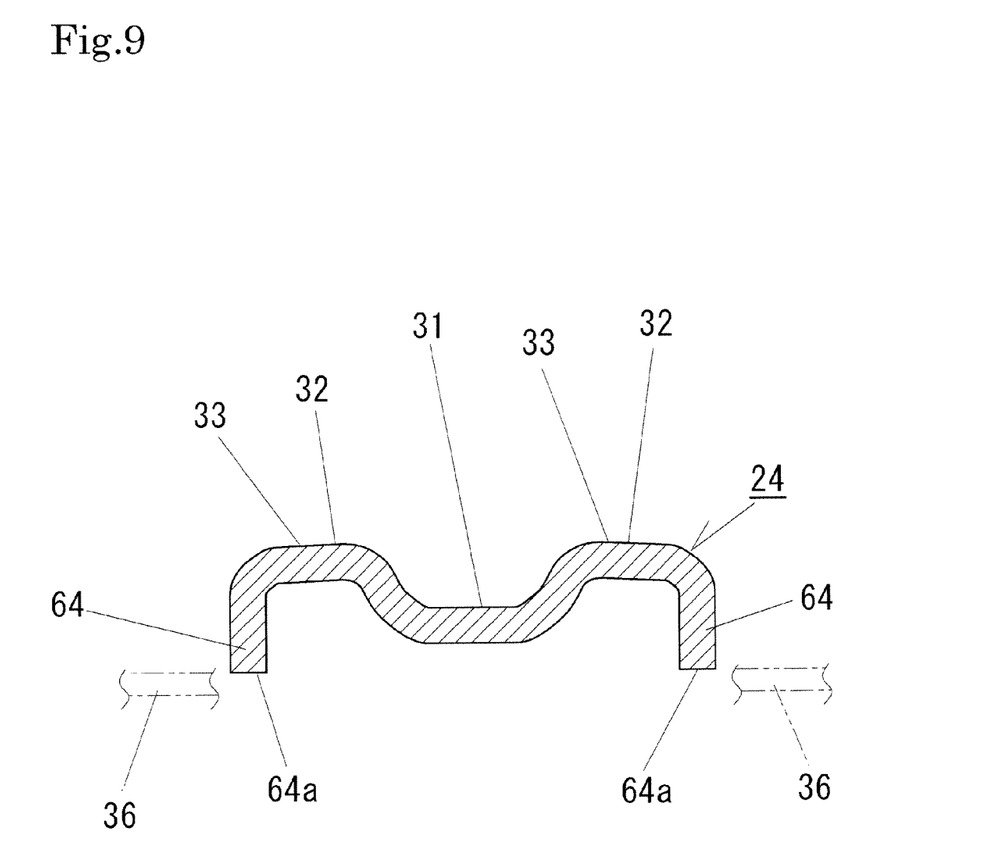
FIG. 9 is a vertical cross-sectional view of a spoke section 64 in still another example 2.

As still another example 2 of the above-described embodiment, there has been proposed a configuration in which, as shown in FIG. 9, an end surface 64a of a flange section 64 of the spoke section 24 is formed at the same height position in the front-rear direction as the surface of the front edge section 36 of the disk flange section 25. Here, the end surface 64a of the flange section 64 is formed in a direction perpendicular to the central axis L like the above-described embodiment. The example 2 is the same as the above-described examples except that it is provided with the flange section 64, and like reference numerals are attached to the same components as the above-described embodiment and description thereof is omitted. In the configuration of the example 2, the length of the flange section 64 in the front-rear direction is longer than the above-described embodiment, so that the strength and rigidity which withstand the bending/torsional loads can be intensified further and accompanied by this, the durability is improved. Further, because the end surface 64a of the flange section 64 is at the same height position in the front-rear direction as the surface of the front edge section 36, so that a configuration in which both of them are formed consecutively with each other smoothly can be achieved easily. Consequently, the design characteristic of the decorative hole 27 is intensified further. The configuration of the example 2 achieves the same operation and effect as the above-described embodiment. Although, according to the configuration of the example 2, the end surface 64a of the flange section 64 is at the same height position as the surface of the front edge section 36 of the disk flange 25, the end surface 64a may be set to the same height position as the rear surface of the front edge section 36.

Figure 10:
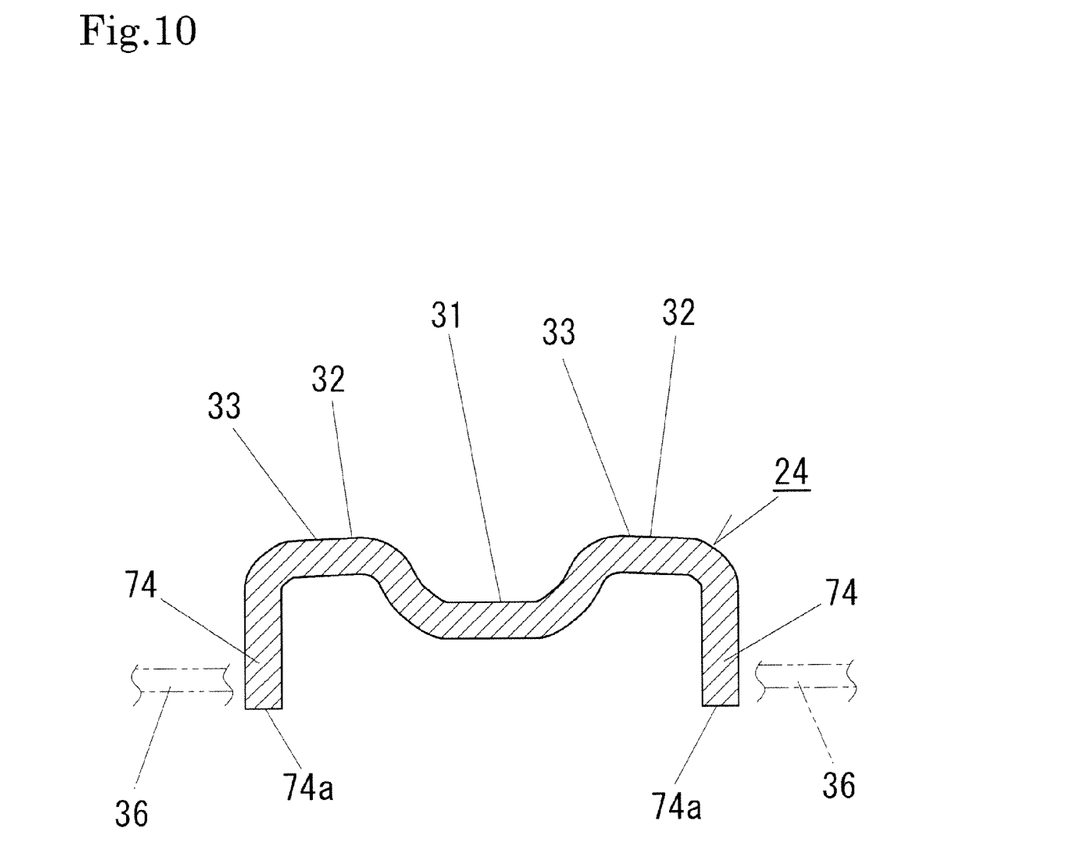
FIG. 10 is a vertical cross-sectional view of a spoke section 74 in yet still another example 3.

As still another example 3 of the above-described embodiment, there has been proposed a configuration in which, as shown in FIG. 10, an end surface 74a of a flange section 74 of the spoke section 24 is extended beyond the rear surface of the front edge section 36 of the disk flange section 25. Here, the end surface 74a of the flange section 74 is formed in a direction perpendicular to the central axis L like in the above-described embodiment. Then, because the example 3 is the same as the above embodiment except that it has such a flange section 74, like reference numerals are attached to the same components as the above-described embodiment and description thereof is omitted. In the configuration of the example 3, the length of the flange section 74 in the front-rear direction is longer than the above-described embodiment. As a result, the strength and rigidity which withstand the bending/torsional loads can be improved further, and accompanied by this, the durability is also improved. As described above, the configuration of the example 3 achieves the same operation and effect as the above-described embodiment.

On the other hand, although, in the configurations of the above-described embodiment and the examples 1 to 3, the height positions in the front-rear direction of the central groove section of the spoke section and the front edge section of the disk flange section are substantially the same, a configuration in which the central groove section is located on the front side with respect to the front edge section or a configuration in which the central groove section is located on the rear side with respect to the front edge section may be adopted as other configurations.

Although the configurations of the above-described embodiment and the examples 1 to 3 contain the five spoke sections, the present invention is not restricted to this number but may adopt a configuration containing three, four, six, seven or other multiple spoke sections.

Although, in the configurations of the above-described embodiment and the examples 1 to 3, a wheel rim formed of a steel sheet and a wheel disk are joined together, the wheel rim and the wheel disk may be formed using an aluminum alloy sheet and joined together. Furthermore, the wheel rim and the wheel disk may be formed using a magnesium alloy or titanium alloy sheet. Moreover, the wheel rim and the wheel disk may be formed of different kinds of metallic sheets.

The present invention is not restricted to the above-described embodiment. Other configurations than that of the above-described embodiment may be carried out appropriately within the scope of the present invention.

DESCRIPTION OF REFERENCE NUMERALS

1: automobile wheel
2: wheel rim
3: wheel disk
21: hub mounting section
24: spoke section
25: disk flange section
27: decorative hole
31: central groove section
32: raised side section
33: peak side section
34, 54, 64, 74: flange section
35: connector section
36: front edge section

The invention claimed is:
1. An automobile wheel comprising:
a wheel rim on which a tire is to be mounted; and
a wheel disk including a hub mounting section to be attached to an axle, a disk flange section which is fit to an internal surface of the wheel rim, and a plurality of spoke sections for connecting the hub mounting section to the disk flange section, wherein the spoke section includes a central groove section which is dented rearward in a radial direction and raised side sections which are raised toward a front side from both side edges of the central groove section along the radial direction, and each of the raised side sections includes a peak side section which protrudes most toward the front side and flange sections which extend rearward from side edges of the peak side section, wherein the disk flange section includes a connector section which is provided in a front-rear direction and fit to the wheel rim, and a circular front edge section which is extended from a front edge of the connector section such that the front edge section is bent inward in the radial direction and which is retreated rearward with respect to the peak side section of the raised side section of the spoke section, and wherein a decorative hole is defined by the flange sections of adjacent spoke sections and the front edge section of the disk flange section.

2. The automobile wheel according to claim 1, wherein a height position in the front-rear direction of an outer end section of the central groove section which configures the spoke section is set to substantially a same position as the height position in the front-rear direction of the front edge section of the disk flange section.

3. An automobile wheel comprising:
a wheel rim on which a tire is to be mounted; and
a wheel disk including a hub mounting section to be attached to an axle, a disk flange section which is fit to an internal surface of the wheel rim, and a plurality of spoke sections for connecting the hub mounting section to the disk flange section, wherein the spoke section includes a central groove section which is dented rearward in a radial direction and raised side sections which are raised toward a front side from both side edges of the central groove section along the radial direction, and each of the raised side sections includes a peak side section which protrudes most toward the front side and flange sections which extend rearward from side edges of the peak side section, wherein the disk flange section includes a connector section which is provided in a front-rear direction and fit to the wheel rim, and a circular front edge section which is extended from a front edge of the connector section such that the front edge section is bent inward in the radial direction and which is retreated rearward with respect to the peak side section of the raised side section of the spoke section, wherein a decorative hole is defined by the flange sections of adjacent spoke sections and the front edge section of the disk flange section, and wherein the flange section of the raised side section which configures the spoke section is extended up to a height position in the front-rear direction of the front edge section of the disk flange section.

4. The automobile wheel according to claim 3, wherein a height position in the front-rear direction of an outer end section of the central groove section which configures the spoke section is set to substantially a same position as the height position in the front-rear direction of the front edge section of the disk flange section.

5. An automobile wheel comprising:
a wheel rim on which a tire is to be mounted; and
a wheel disk including a hub mounting section to be attached to an axle, a disk flange section which is fit to an internal surface of the wheel rim, and a plurality of spoke sections for connecting the hub mounting section to the disk flange section, wherein the spoke section includes a central groove section which is dented rearward in a radial direction and raised side sections which are raised toward a front side from both side edges of the central groove section along the radial direction, and each of the raised side sections includes a peak side section which protrudes most toward the front side and flange sections which extend rearward from side edges of the peak side section, wherein the disk flange section includes a connector section which is provided in a front-rear direction and fit to the wheel rim, and a circular front edge section which is extended from a front edge of the connector section such that the front edge section is bent inward in the radial direction and which is retreated rearward with respect to the peak side section of the raised side section of the spoke section, wherein a decorative hole is defined by the flange sections of adjacent spoke sections and the front edge section of the disk flange section, and wherein the flange section of the raised side section which configures the spoke section is extended rearward beyond the front edge section of the disk flange section.

6. The automobile wheel according to claim 5, wherein a height position in the front-rear direction of an outer end section of the central groove section which configures the spoke section is set to substantially a same position as the height position in the front-rear direction of the front edge section of the disk flange section.

* * * * *